US012765442B2

(12) United States Patent
Fay, II

(10) Patent No.: US 12,765,442 B2
(45) Date of Patent: Oct. 20, 2026

(54) MOWING ASSEMBLY TRANSPORT MECHANICAL INTERLOCK

(71) Applicant: CNH Industrial America LLC, New Holland, PA (US)

(72) Inventor: Jeffrey Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 410 days.

(21) Appl. No.: 18/382,303

(22) Filed: Oct. 20, 2023

(65) Prior Publication Data

US 2025/0127071 A1 Apr. 24, 2025

(51) Int. Cl.
*A01B 73/00* (2006.01)
*A01D 34/03* (2006.01)

(52) U.S. Cl.
CPC .......... *A01B 73/005* (2013.01); *A01D 34/032* (2013.01)

(58) Field of Classification Search
CPC ....... A01B 73/005; A01B 73/02; A01B 73/06; A01B 73/048; A01B 73/04; A01B 73/042; A01B 73/00; A01B 63/10; A01B 63/14; A01B 63/22; A01B 63/32; A01B 59/04; A01D 34/032; A01D 34/64; A01D 34/664; A01D 34/665; A01D 78/1014; A01D 75/004
USPC .... 56/228, 15.1, 15.9, 192, 13.6, 15.5, 15.6, 56/385; 172/240, 622, 456, 452, 478, 58, 172/583, 588; 280/491.3, 491.4, 444; 403/119
See application file for complete search history.

(56) References Cited

U.S. PATENT DOCUMENTS 3,713,495 A * 1/1973 Redford ............... A01B 73/044 16/346
3,736,735 A * 6/1973 Kulak .................. A01D 34/661 56/13.6
3,941,194 A * 3/1976 Orthman .............. A01B 73/044 172/311
4,023,623 A * 5/1977 Anderson ............ A01B 73/044 74/105
4,360,215 A * 11/1982 Nohl .................... A01B 73/067 280/43.23
4,442,662 A * 4/1984 Jennings .............. A01B 73/005 172/625
4,534,416 A * 8/1985 Johnson ................. A01B 63/22 172/466
4,796,910 A * 1/1989 Starr, Sr. ................ B60G 11/42 267/51

(Continued)

FOREIGN PATENT DOCUMENTS

CZ 30799 A3 * 7/1999 ........... A01D 75/004
DE 102009023956 A1 * 4/2010 ........... A01B 73/044

(Continued)

*Primary Examiner* — Christopher J Sebesta
*Assistant Examiner* — Sunny D Webb
(74) *Attorney, Agent, or Firm* — CM Law PLLC; Stephen J. Weed

(57) ABSTRACT

A mowing assembly that is towed behind an agricultural vehicle. The mowing assembly has an integrated lateral transport mechanism that is deployed using actuators such as hydraulic actuators. A physical support is provided between a trail frame that supports a mowing device and a transport frame to support the mowing device and the trail frame in the event of an actuator failure during transport.

20 Claims, 7 Drawing Sheets

(56) References Cited

U.S. PATENT DOCUMENTS

| | | | | | |
|---|---|---|---|---|---|
| 4,871,030 | A * | 10/1989 | Kruse | A01B 63/22 172/478 |
| 4,986,064 | A * | 1/1991 | Ermacora | A01D 75/002 280/415.1 |
| 6,112,827 | A * | 9/2000 | Reiber | A01B 73/065 172/311 |
| 6,761,228 | B2 * | 7/2004 | Dobson | A01B 73/04 172/311 |
| 7,549,482 | B2 * | 6/2009 | Wake | A01C 7/208 172/311 |
| 7,926,249 | B1 * | 4/2011 | Cook | A01B 73/005 172/240 |
| 9,179,591 | B2 | 11/2015 | Barnett et al. | |
| 9,179,592 | B2 * | 11/2015 | Snider | A01B 69/003 |
| 9,596,808 | B2 * | 3/2017 | Fay, II | A01B 73/005 |
| 11,343,953 | B2 | 5/2022 | Fay et al. | |
| 11,497,168 | B2 | 11/2022 | Fay | |
| 2015/0068177 | A1 * | 3/2015 | Harkcom | A01D 34/00 56/15.5 |
| 2022/0240431 | A1 | 8/2022 | Dechristopher et al. | |

FOREIGN PATENT DOCUMENTS

| | | | | |
|---|---|---|---|---|
| EP | 1163830 | A1 * | 12/2001 | A01B 73/005 |
| EP | 1800529 | A1 * | 6/2007 | A01D 34/661 |
| EP | 3028557 | A1 * | 6/2016 | A01D 75/303 |
| ES | 2866405 | T3 * | 10/2021 | A01D 34/661 |
| WO | WO-8804134 | A * | 6/1988 | A01B 73/02 |

* cited by examiner

MOWING ASSEMBLY TRANSPORT MECHANICAL INTERLOCK

BACKGROUND OF THE INVENTION

The present invention pertains to an agricultural mowing assembly and, more specifically, to a transport system for the agricultural mowing assembly.

A farmer may use an agricultural mowing assembly, such as a mower or mower conditioner, to cut crop material like hay or grass and deposit the cut crop material onto the field in windrows or swaths. Typically, the mowing assembly is towed behind an agricultural vehicle, such as a tractor. For cutting large fields, many mowing assemblies include a driving vehicle that pushes a mowing assembly conditioner in front of the vehicle while simultaneously pulling another mowing assembly conditioner behind the vehicle.

The transport system of a pull-behind mowing assembly is used to reduce the overall profile of the mowing assembly for transportation thereof. Generally, due to practical or regulatory limits, the width of the mowing assembly in its operating orientation prevents the towed transportation of the mowing assembly on farm lanes, roadways, or through gates. To reduce the width of the mowing assembly, the transport system may include a separate transport trailer or an integrated transport subframe with transport wheels that selectively support the mowing assembly.

The separate transport trailer may reorient the mowing assembly and carry the mowing assembly with its width extending along the longitudinal length of the transport trailer. In this regard, the mowing assembly is arranged parallel to the forward direction of travel of the towing vehicle. Actuators (such as hydraulic actuators) may be used to position the mowing assembly with respect to the transport trailer. In the event that one or more actuators fail, the mowing assembly may be damaged, e.g., by contact with the roadway during transport.

What is needed in the art is a cost-effective and efficient backup system for mowing assembly lateral transport systems.

BRIEF SUMMARY OF THE INVENTION

In some aspects, the techniques described herein relate to a mowing assembly having an integrated transport mechanism. The mowing assembly includes a trail frame configured to support a mowing device of the mowing assembly and to be towed by an agricultural vehicle. The mowing device has a field position and a transport position. The transport frame has a stowed state in which the transport frame is positioned above the mowing device and a transport state in which the mower is supported by the transport frame for transport. A support structure is coupled to the transport frame and has a support surface. A mating structure is coupled to the trail frame and has a mating surface. The mating structure is positioned on the trail frame such that the mating surface is adjacent the support surface when the mowing device is in the transport position and the transport frame is in the transport state.

In some aspects, the techniques described herein relate to a mowing system including an agricultural vehicle and a mowing assembly described herein coupled to the agricultural vehicle.

In some aspects, the techniques described herein relate to a method for transporting a mowing assembly having an integrated lateral transport mechanism, the mowing assembly including a trail frame configured to support a mowing device of the mowing assembly and to be towed by an agricultural vehicle, a transport frame having a stowed state in which the transport frame is above the mowing device and a transport state in which the mowing assembly is supported by the transport frame for transport, a first support structure coupled to the transport frame, the first support structure having a horizontal surface, and a second support structure coupled to the trail frame, the second support structure having a mating surface that is adjacent the horizontal surface of the first support structure when the transport frame is in the transport state. The method includes moving the transport frame from a stowed state to a transport state in which the transport frame supports the mowing assembly and rotating the trail frame with respect to the transport frame until the mating surface is adjacent the horizontal surface when the transport frame is in the transport state for transport by the integrated lateral transport mechanism.

BRIEF DESCRIPTION OF THE SEVERAL VIEWS OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
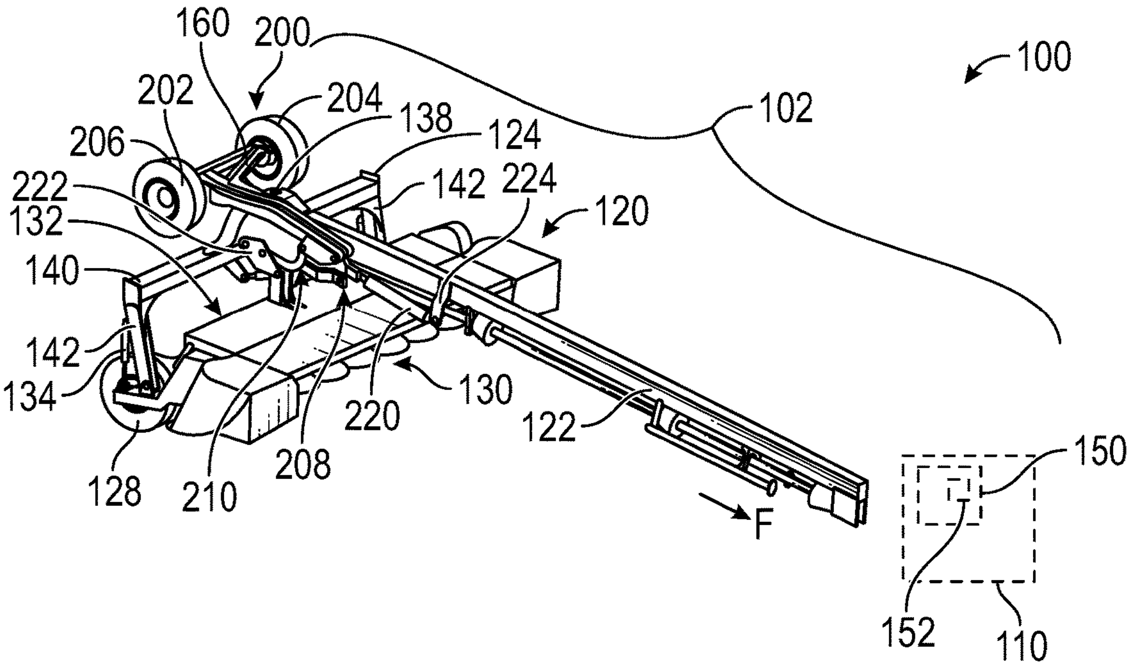
FIG. 1 is a perspective view of an exemplary embodiment of an agricultural mowing assembly, the agricultural mowing assembly including an agricultural vehicle and a towed agricultural mowing device, the agricultural mowing assembly includes a towing tongue and a transport system connected to the towing tongue, and the agricultural mowing assembly is shown to be in an intermediate field position, in accordance with an exemplary embodiment of the present invention.

The terms "forward", "rearward", "left" and "right", when used in connection with the agricultural mowing assembly and/or components thereof are usually determined with reference to the direction of forward operative travel of the towing vehicle, but they should not be construed as limiting. The terms "longitudinal" and "transverse" are determined with reference to the fore-and-aft direction.

Referring now to the drawings, and more particularly to FIGS. 1-5, there is shown an agricultural mowing system 100 that includes an agricultural vehicle 110 and an agricultural mowing assembly 102, which is towed by the agricultural vehicle 110 in a forward direction of travel F. The agricultural vehicle 110 generally includes a chassis, a prime mover, wheels and/or tracts, and a cab for housing the operator. The vehicle 110 can be in the form of any desired agricultural vehicle, such as a tractor or self-propelled windrower.

Figure 2:
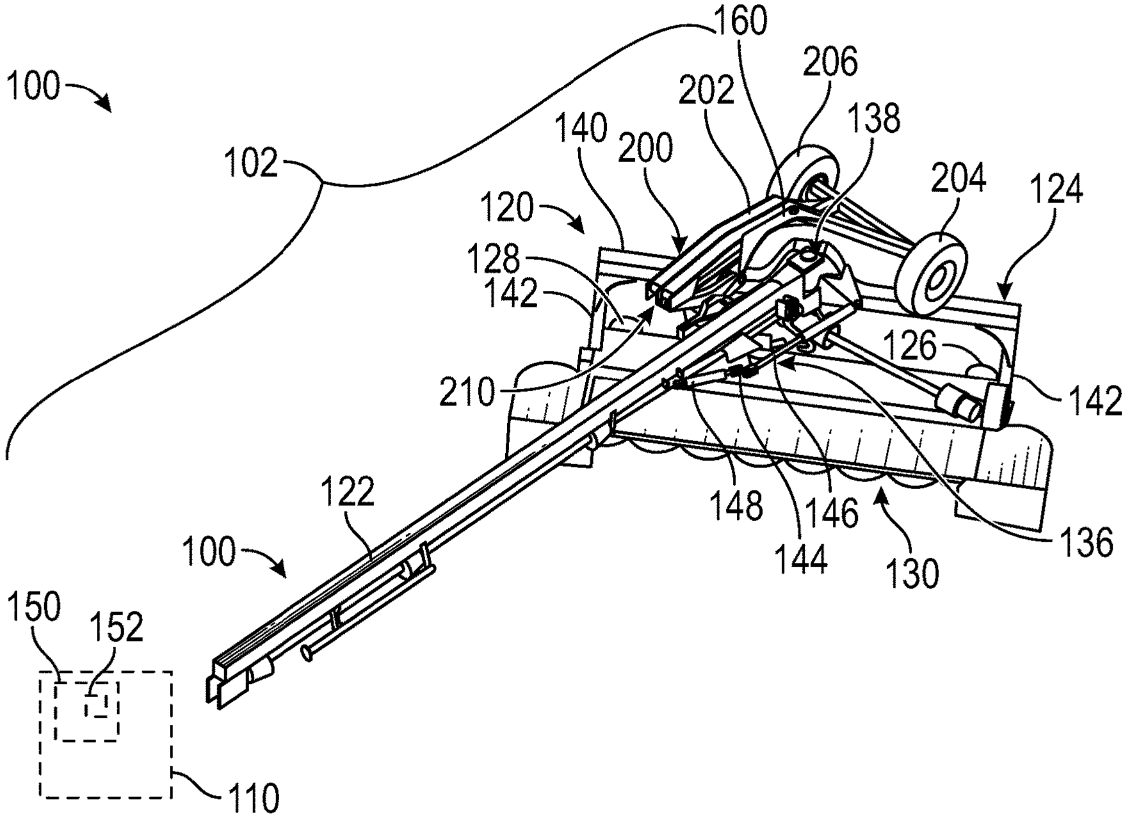
FIG. 2 is another perspective view of the agricultural mowing assembly of FIG. 1, and the agricultural mowing assembly is shown to be in a full field left position.
Figure 3:
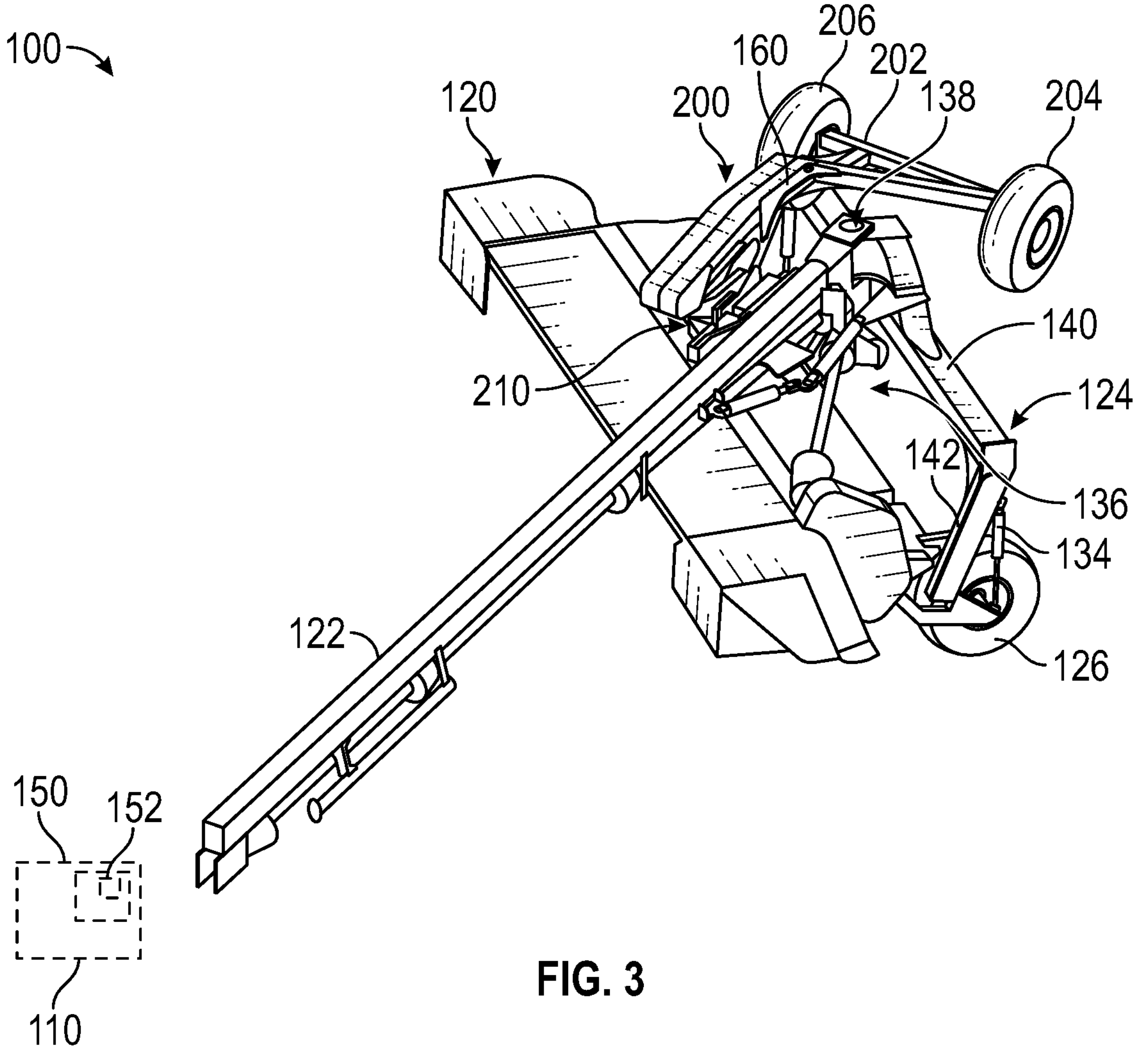
FIG. 3 is another perspective view of the agricultural mowing assembly of FIGS. 1-2, and the agricultural mowing assembly is shown in a full field right position.
Figure 4:
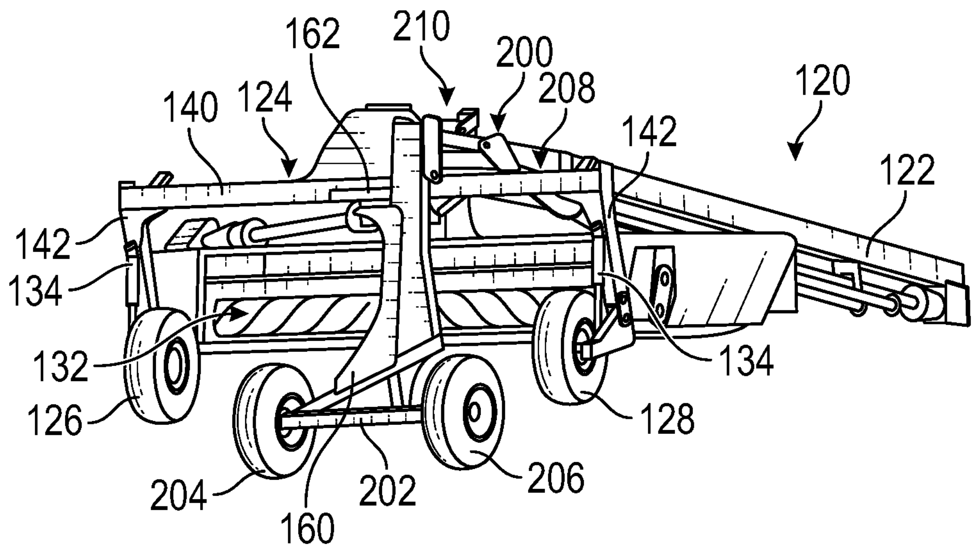
FIG. 4 is a rear perspective view of the agricultural mowing assembly of FIGS. 2-3, with the transport system deployed and before lateral rotation of the trail frame.
Figure 5:
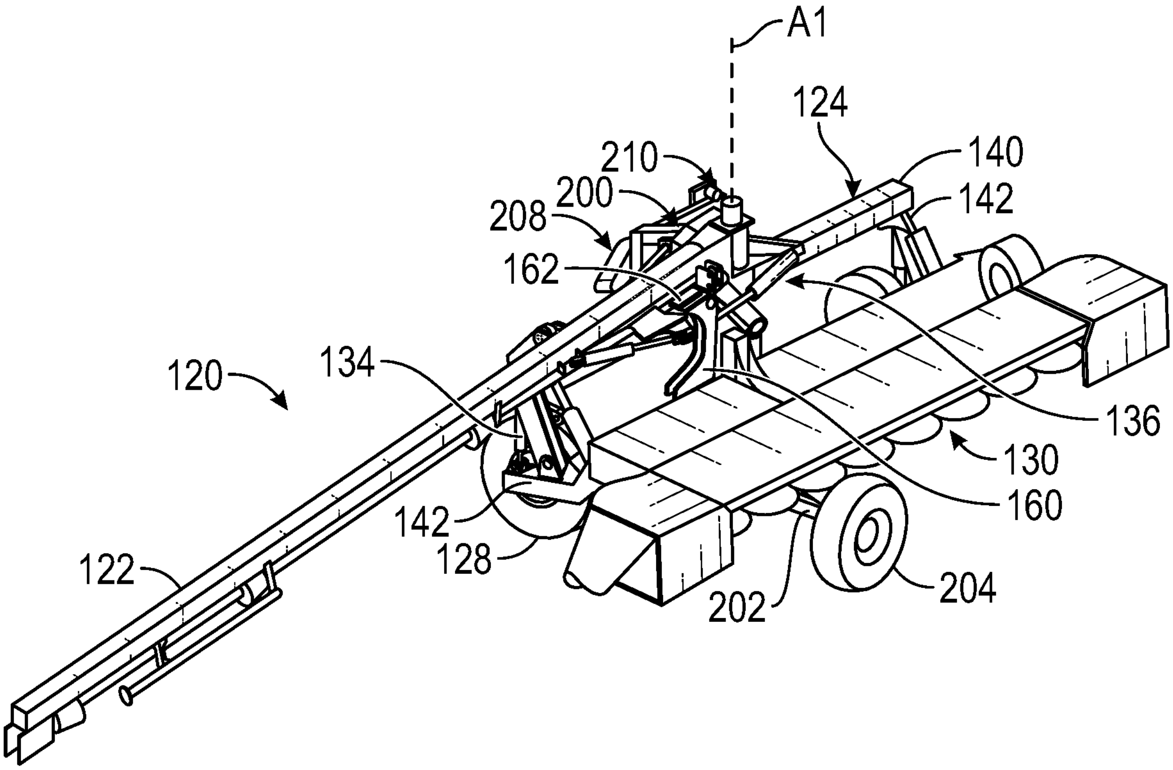
FIG. 5 is a side perspective view of the agricultural mowing assembly of FIGS. 1-4, with the agricultural mowing assembly in a transport position wherein the transport system is deployed for supporting the agricultural mowing assembly.

The mowing device 120 may be in the form of a center pivot mowing device or mowing device conditioner. As shown, the mowing device 120 is in the form of a center pivot mowing device conditioner. However, the mowing device 120 may be in the form of any desired mowing device. The mowing device 120 is configurable in a field position for cutting a crop material in the field (FIGS. 1-3) and a transport position for transporting the agricultural mowing device 120 (FIG. 5). The mowing device 120 may also be positioned between various field positions, such as an intermediate field position (FIG. 1), a full field left position (FIG. 2), and a full field right position (FIG. 3).

The mowing device 120 may generally include a towing tongue 122 connected to the agricultural vehicle 110, a trail frame 124 rotatably connected to the towing tongue 122 about an axis of rotation Al, trail frame wheels 126, 128, a cutter bar 130, a pair of conditioning rollers 132, a pair of lift actuators 134 operably connected in between the trail frame 124 and the trail frame wheels 126, 128, a trail frame actuating mechanism 136 for rotating the trail frame 124 and the cutter bar 130 therewith, and a lateral transport system 200 connected to the towing tongue 122 for selectively supporting the mowing device 120 in the transport position. The mowing device 120 may also include a controller 150, with a memory 152, for automatically controlling the trail frame actuating mechanism 136 and the transport system 200.

The towing tongue 122 removably connects to the agricultural vehicle 110. The towing tongue 122 has a first, proximal end and a second, distal end. The first end of the towing tongue 122 is connected to the agricultural vehicle 110. The second end of the towing tongue 122 rotatably mounts the trail frame 124 about the axis of rotation. The second end of the towing tongue 122 may rotatably mount the trail frame 124 via any desired mounting bracket 138. The towing tongue 122 may comprise any desired material, such as metal.

The trail frame 124 is rotatably connected to the towing tongue 122 via the mounting bracket 138 and the trail frame 124 accordingly rotates about the vertical axis of rotation Al. The trail frame 124 has a horizontal main beam 140 and a pair of vertical side beams 142 which downwardly extend from the main beam 140. The main beam 140 is rotatably connected to the towing tongue 122 about the axis of rotation Al. The main beam 140 is located underneath the transport system 200. The side beams 142 respectively rotatably mount the trail frame wheels 126, 128. The trail frame 124 supports the weight of the mowing device 120 in the field position but the trail frame 124 does not support the weight of the mowing device 120 in the transport position. Hence, the trail frame wheels 126, 128 support the trail frame 124 in the field position but do not support the trail frame 124, or any other component of the mowing device 120, in the transport position (FIG. 5). The trail frame 124 may comprise any desired shape and material.

The cutter bar 130 is connected to the trail frame 124. The cutter bar 130 cuts the crop material in the field position. The cutter bar 130 may be in the form of any desired cutter bar 130, such as a sickle bar or rotating disc cutter bar. The cutter bar 130 has a front end or edge and a back end or edge that is located behind the front end in the direction of crop material flow, i.e., opposite to the forward direction travel F. The front end of the cutter bar 130 defines a front longitudinal axis. It should be appreciated that the front edge of the cutter bar 130 may be defined by the front edge of the rock guards.

The conditioning rollers 132 are located downstream of the cutter bar 130. The conditioning rollers 132 condition the crop material as it exits the mowing device 120. The conditioning rollers 132 may be in the form of any desired rollers. As can be appreciated, the mowing device 120 may or may not include conditioning rollers 132.

The lift actuators 134 are respectively connected in between the trail frame 124 and the trail frame wheels 126, 128. More particularly, each lift actuator 134 is transversely connected in between the trail frame 124 and an extension bracket (unnumbered) of a respective trail frame wheel 126, 128. The lift actuators 134 pivot the trail frame wheels 126, 128 up or down to thereby raise or lower the trail frame 124, i.e., the rear of the mowing device 120. Thereby, the lift actuators 134 may create additional clearance or space for allowing the transport system 200 to move into a position for supporting the mowing device 120. The lift actuators 134 may be in the form of any desired hydraulic and/or electric cylinders. For example, the lift actuators 134 may be in the form of hydraulic lift cylinders 134 which are hydraulically connected to the hydraulic system of agricultural vehicle 110 via one or more fluid lines.

The trail frame actuating mechanism 136 is operably connected in between the towing tongue 122 and the trail frame 124. The trail frame actuating mechanism 136 rotates the trail frame 124 in between its field positions for field operation and into its lateral/transport position for transport. As used herein, the field right and left positions of the trail frame 124 may refer to any desired field-operating orientation of the trail frame 124 in which the trail frame 124 is not perpendicular to the towing tongue 122.

The trail frame actuating mechanism 136 includes a rotational link 144, a first trail frame actuator 146 (a field swing actuator), and a second trail frame actuator 148 (a transport swing actuator; FIG. 2). The rotational link 144 is rotatably connected to the towing tongue 122 and extends outwardly from the towing tongue 122. The rotational link 144 may be in the form of a flat plate. The rotational link 144 operably connects the first and second trail frame actuators 146, 148 to the towing tongue 122 at a location which is distally located away from the towing tongue 122 so that the first and second trail frame actuators 146, 148 may act in conjunction to swing the trail frame 124 between its field right and left positions and also rotate the trail frame 124 into and out of its lateral position in the transport position. The rotational link 144 is capable of rotating forwardly or rearwardly relative to the towing tongue 122 upon retraction or extension of the first and/or second trail frame actuators 146, 148.

The first trail frame actuator 146 is connected to the trail frame 124, via a corresponding bracket (unnumbered), and the rotational link 144. The second trail frame actuator 148 is connected to the towing tongue 122 and the rotational link 144. The first and/or second trail frame actuator 146, 148 may be used to rotate the trail frame 124 throughout any desired position of the trail frame 124. By way of example only, the first trail frame actuator 146 may be in the form of a field swing actuator 146 for rotating the trail frame 124 in between its field intermediate, right, and left positions. The second trail frame actuator 148 may be in the form of a transport swing actuator 148 for rotating the trail frame 124 in between its lateral position for transport and its extended, e.g., substantially perpendicular, field position for field operation. The first and second trail frame actuators 146, 148 may be in the form of any desired hydraulic and/or electric cylinders. For example, the first and second trail frame actuators 146, 148 may be in the form of hydraulic cylinders 146, 148 which are hydraulically connected to the hydraulic system of agricultural vehicle 110 via one or more fluid lines. As can be appreciated, the first and second trail frame actuators 146, 148 may or may not be identical actuators.

The transport system 200 (in a deployed transport state) supports the mowing device 120, e.g., the trail frame 124, the cutter bar 130, and/or the towing tongue 122, in the transport position (FIG. 5) but does not support the mowing device 120 in the field position (FIGS. 1-2), during which the transport system 200 is in a stowed state. The transport system 200 includes a transport frame 202 rotatably connected to the towing tongue 122, transport wheels 204, 206 rotatably connected to the transport frame 202, and a transport actuating mechanism 208 for movably, i.e., rotatably, connecting the transport frame 202 to the towing tongue 122. Since the transport system 200 is connected to the side of the towing tongue 122, the transport system 200 does not move in conjunction with the trail frame 124. Also, the side or lateral location of the transport system 200 allows the weight of the mowing device 120 to be more evenly distributed between the transport wheels 204, 206.

The transport frame 202 is rotatable in between a retracted stowed state in the field position wherein the transport frame 202 is located above the trail frame 124 (FIGS. 1-3) and an extended transport state in the transport position wherein the transport wheels 204, 206 support the trail frame 124 (FIG. 5) on a transport surface (e.g., the ground or a roadway). The transport frame 202 is rotatably connected to the towing tongue 122, via the transport actuating mechanism 208, at a location forward of the axis of rotation Al of the trail frame 124 in the direction of forward travel F. Hence, the transport frame 202 is at least partially located in front of the axis of rotation Al of the trail frame 124 in the direction of forward travel F in the field position, and the transport frame 202 is located rearwardly of the axis of rotation Al of the trail frame 124 in the direction of forward travel F in the transport position. The transport frame 202 rotates about a substantially horizontal axis of rotation, plus or minus 30 degrees. Also, the connection point of the transport frame 202 is located vertically above the main beam 140 of the trail frame 124. Thus, the main beam 140 is located underneath the transport frame 202 in the field position such that the main beam 140 passes underneath the transport wheels 204, 206 when the transport frame 202 is in the retracted stowed state in the field position.

The transport frame 202 may include one or more beams which define a bent, elongated member and an axle for mounting the transport wheels 204, 206. Hence, the transport wheels 204, 206 are jointly mounted on a common axle. A support structure 160 is coupled to the transport frame 202 to physically support the trail frame 124 and mowing device 120 in the event of a hydraulic failure by the transport actuator when the transport frame is in the transport state and the mowing device is in the transport position. A mating structure 162 (FIG. 5) is positioned on the trail frame 124 such that it is adjacent the support structure 160 when the mowing device 120 is in the field position and the transport frame 202 is in the transport state. The transport frame 202 may comprise any desired shape and material.

The first and second transport wheels 204, 206 support the weight of the mowing device 120, e.g., the weight of the trail frame 124, the cutter bar 130, and/or the towing tongue 122, upon being fully deployed in the transport position of the mowing device 120. The first transport wheel 204 may be considered a front or left transport wheel 204, and the second transport wheel 206 may be considered a back or right transport wheel 206. The transport wheels 204, 206 may be identical and thus have the same material, size, and weight capacity. The transport wheels 204, 206 may comprise any desired wheels. The first transport wheel 204 is radially located closer to the axis of rotation Al of the trail frame 124 than the front end of the cutter bar 130 in the transport position. Hence, both transport wheels 204, 206 are located behind the front longitudinal axis of the front end of the cutter bar 130, which in turn more evenly distributes the weight of the mowing device 120 between the front and rear transport wheels 204, 206.

The transport actuating mechanism 208 includes a linkage assembly 210, with multiple links (unnumbered), and a transport actuator 220 operably connected in between the towing tongue 122 and the transport frame 202, via the linkage assembly 210. The transport actuating mechanism 208 may also include one or more brackets 222, 224 for mounting the linkage assembly 210 and the transport actuator 220 to the side of the towing tongue 122. For instance, one bracket 222 may be in the form of an elongated bracket that extends outwardly and perpendicularly from the side of the towing tongue 122, and another bracket 224 may be in the form of a shorter actuator bracket 224 that is connected to the side of the towing tongue 122 in front of the location point of the elongated bracket 222. The linkage assembly 210 is rotatably connected in between the transport frame 202 and the towing tongue 122.

The linkage assembly 210 may include a first link connected in between the elongated bracket 222 and the transport frame 202, a second, upper link connected in between the elongated bracket 222 and the transport frame 202, a third link connected to the second link, and a fourth link connected to the elongated bracket 222, the third link, and the transport actuator 220. It should be appreciated that the linkage assembly 210 may include any desired number of links, such as two, three, four, five, or more links. The transport actuator 220 may be connected in between the linkage assembly 210, i.e., fourth link, and the towing tongue 122 via the actuator bracket 224. The transport actuator 220 may be in the form of any desired hydraulic and/or electrical cylinder. For instance, the transport actuator 220 may be in the form of a hydraulic cylinder 220 that is hydraulically connected to the hydraulic system of agricultural vehicle 110 via one or more fluid lines. The transport actuator 220 may be the only actuator for moving the transport frame 202.

The controller 150 is operably connected to the lift, trail frame, and transport actuators 134, 146, 148, 220. The controller 150 may also be operably connected to a user interface within the cab of the agricultural vehicle 110. The controller 150 may automatically position the mowing device 120 in its transport position or field position upon the user inputting a corresponding command into the user interface. The controller 150 may be a standalone controller or integrated into the existing hardware and/or software of the agricultural vehicle 110 and/or mowing device 120.

Figure 6:
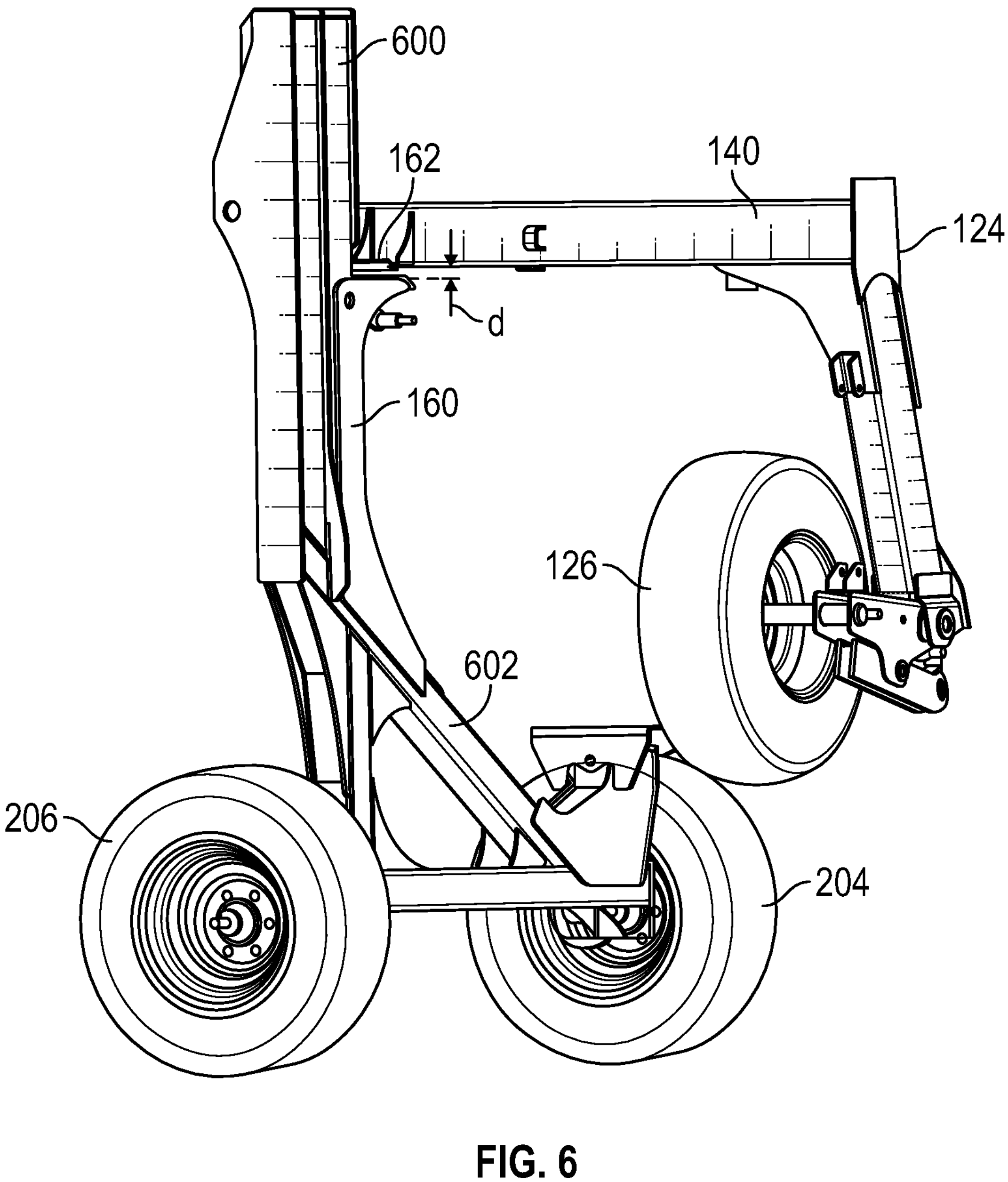
FIG. 6 is a partial perspective view of the transport frame with support structure and the trail frame with mating structure in the transport position illustrating the relationship between the support structure and the mating structure of the agricultural mowing assembly of FIGS. 1-5.

FIG. 6 depicts the transport frame 202 (in the transport state) and the trail frame 124 (in the transport position) with the mating structure 162 of the trail frame 124 positioned above the support structure 160 of the transport frame 202. Due to the positioning of the mating structure 162 above the support structure 160, in the event of a failure of the transport actuator 220 (or one or more corresponding components such as a link in the linkage system) during transport, the transport frame 202 will support the trail frame 124 (including the mowing device 120) through the support structure 160. Thus, damage to the mowing device 120 (e.g., by the roadway) may be prevented in the event of such a failure. A gap “d” between the support structure and the mating structure 162 allows for rotation of the trail frame into the transport position without interference. The gap “d” may be 0.5 inches with a tolerance of plus or minus 50 percent.

The transport frame 202 includes a vertical support 600 and a non-vertical support 602 extending from the vertical support 600 toward the wheels 204/206. The non-vertical support 602 enables the vertical support 600 to be positioned off-center between the wheels 204/206 of the transport mechanism such that the horizontal main beam 140 of the trail frame 124 can be positioned centrally (e.g., equidistant) between the wheels 204/206 when in the transport position.

Figure 7A:
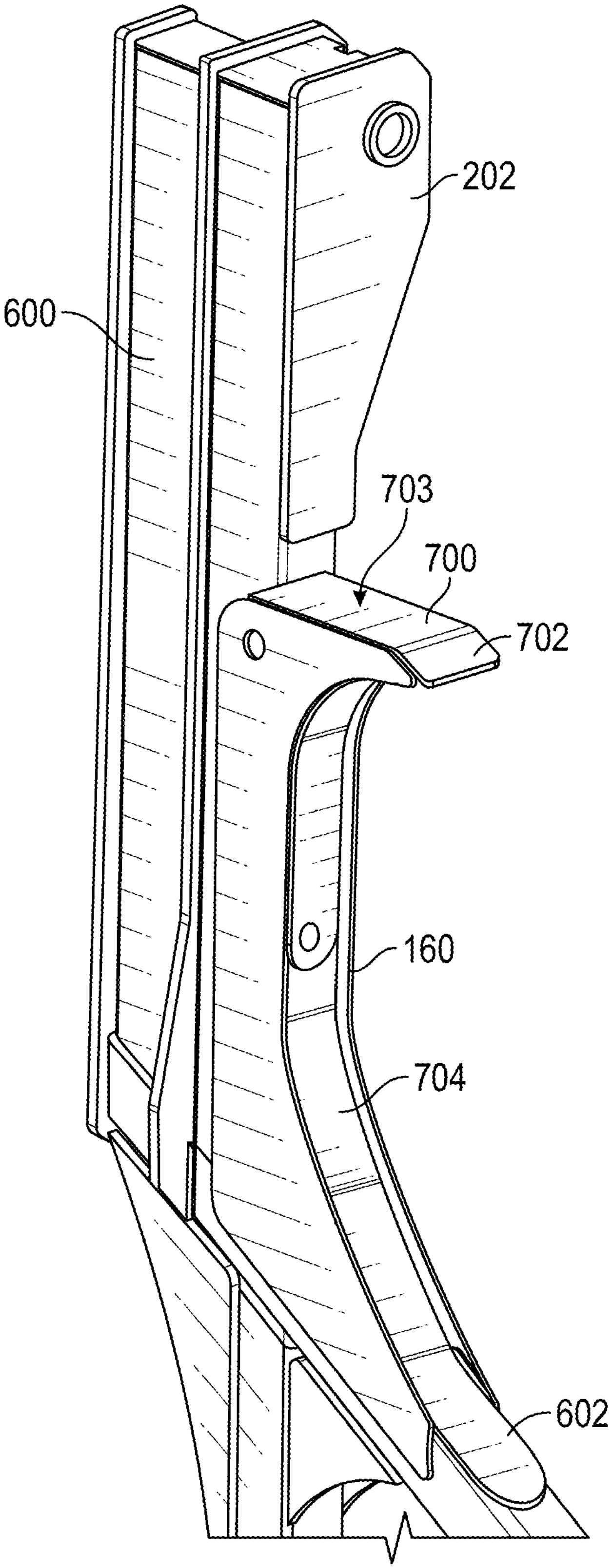
FIG. 7A is a partial perspective view of the support structure coupled to the transport frame.
Figure 7B:
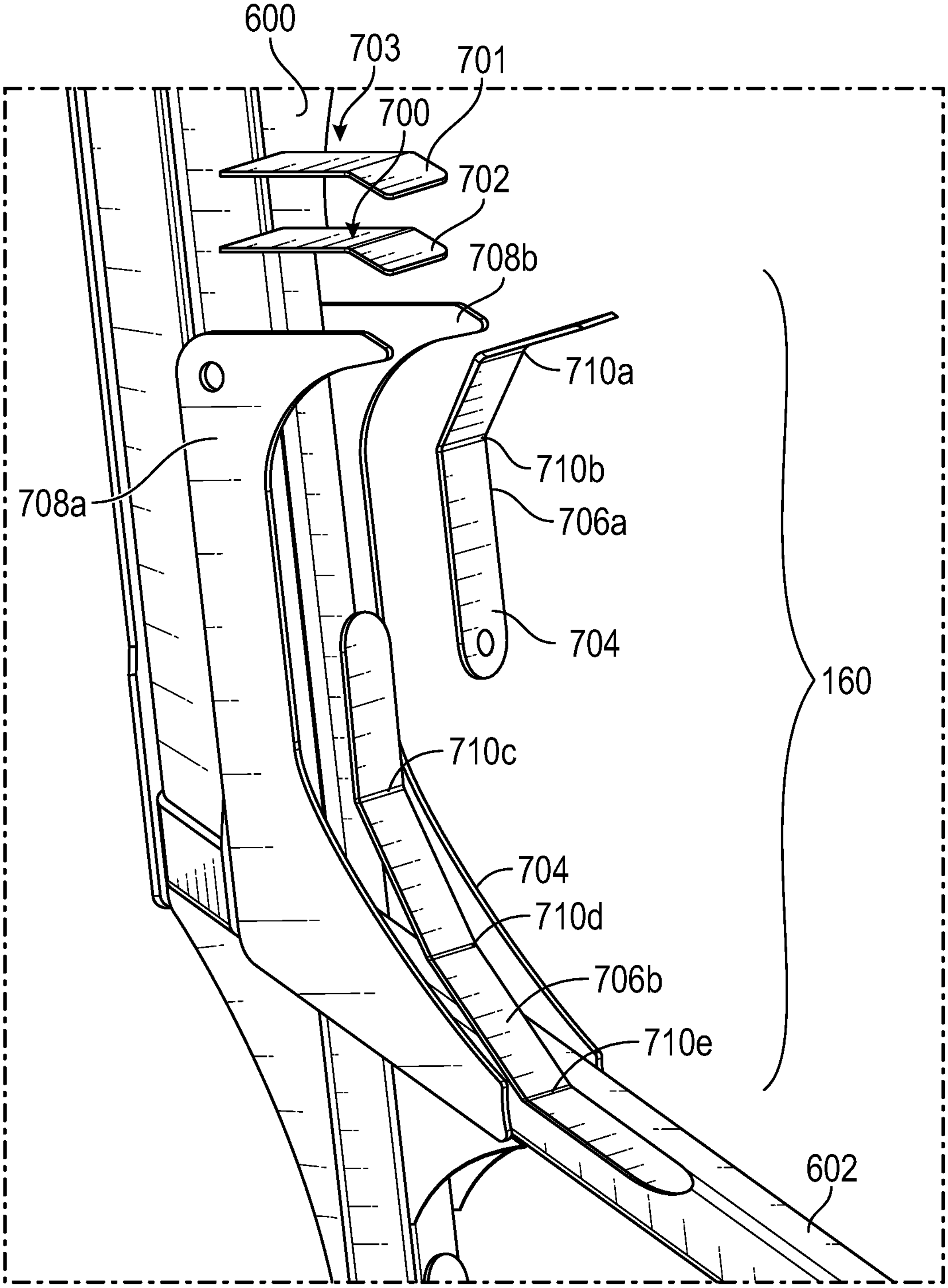
FIG. 7B is a partial perspective view of the support structure and the transport frame of FIG. 7A with the support structure shown in an exploded view.

FIG. 7A is a partial perspective view of the support structure 160 coupled to the transport frame 202 and FIG. 7B depicts the support structure 160 in an exploded view. The support structure 160 includes a bottom plate 700 and an arcuate support structure 704. The bottom plate 700 is horizontal and configured to engage the mating structure 162 (FIG. 6) in the event of a transport actuator failure. A lip 702 of the bottom plate 700 extends downward (e.g., at an angle of 30 degrees) and away from the bottom plate 700 to facilitate rotation of the trail frame 124 into the transport position in the event the gap “d” is not present.

The arcuate support structure 704 extends from the bottom plate 700 to the non-vertical support 602 of the transport frame 202. The arc of the arcuate support structure 704 engages the vertical support 600 and the non-vertical support 602 to disperse forces presented on the bottom plate 700 throughout the transport frame 202. The illustrated arcuate support structure 704 includes a first curved support 706*a* and a second curved support 706*b*. The first curved support 706*a* includes a first bend 710*a* and a second bend 710*b* to create 3 segments. The second curved support 706*b* includes a first band 710*c*, a second bend 710*d*, and a third bend 710*e* creating four segments. Although the illustrated arcuate support structure 704 includes two supports with the first support having two bends and the second support having three bends, one of skill in the art will recognize that additional or fewer curved supports, each with additional or fewer bends may be incorporated. Alternatively, the arcuate support structure 704 may have a continuous bend formed from one or more pieces.

A pair of lateral supports 708*a, b* are positioned on opposite sides of the bottom plate 700 and the arcuate support structure 704. The bottom plate 700 and arcuate support structure 704 are positioned between the lateral supports 708*a, b*, which provide support for those components and couple the components to the transport frame 202. Each lateral support 708*a, b* is configured to engage a respective side of the vertical support 600 and the non-vertical support 602.

A pad 701 (FIG. 7B) is optionally coupled to the top surface 703 of the bottom plate 700. The pad 701 is positioned on the top surface 703 of the bottom plate 700 such that it is adjacent the mating surface 808 (FIG. 8B) of the mating structure 162 when the transport frame 202 is in the transport state and the trail frame 124 is rotated into the transport position. The pad 701 may be formed from an ultra high molecular weight (UHMW) plastic. The material for the pad and the gap “d” are selected to reduce noise and wear caused by contact between the support structure 160 and the mating structure 162 during transport. The pad 701 may be coupled to the bottom plate 700 using an adhesive or a fastener(s) such as a bolt or rivet.

In an example, the components of the support structure 160 are metal and are coupled together via welds at one or more intersections between the components (with an optional pad 701 on a top surface of the bottom plate 700). In accordance with this example, the support structure 160 is fastened to the transport frame 202 by welds between the lateral supports 708*a, b* and the respective sides of the vertical support 600 and non-vertical support 602.

Figure 8A:
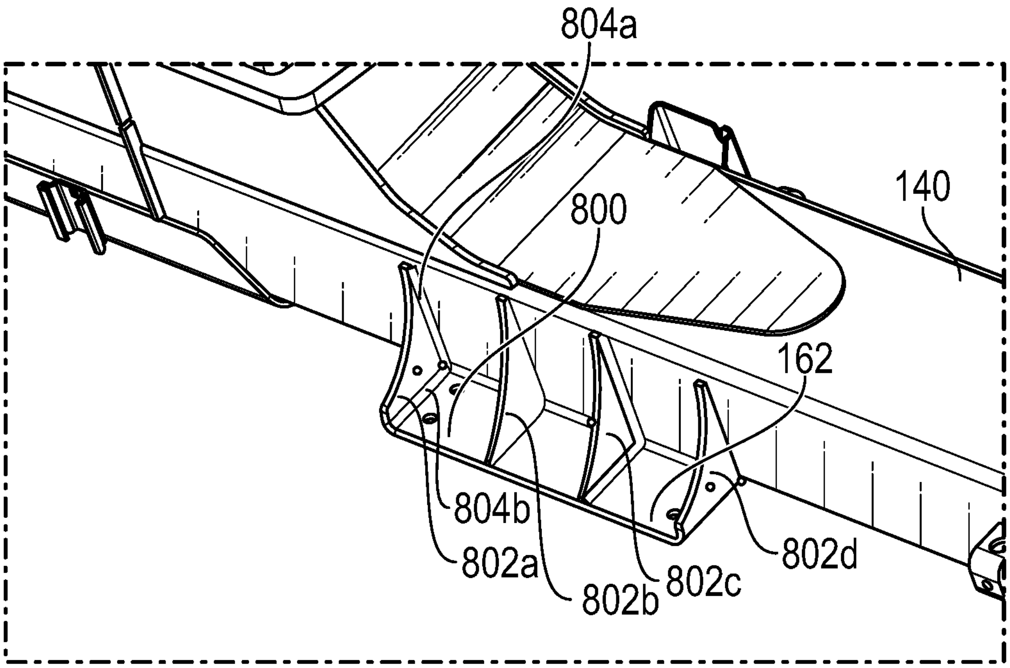
FIG. 8A is a top perspective view of the mating structure coupled to the trail frame.
Figure 8B:
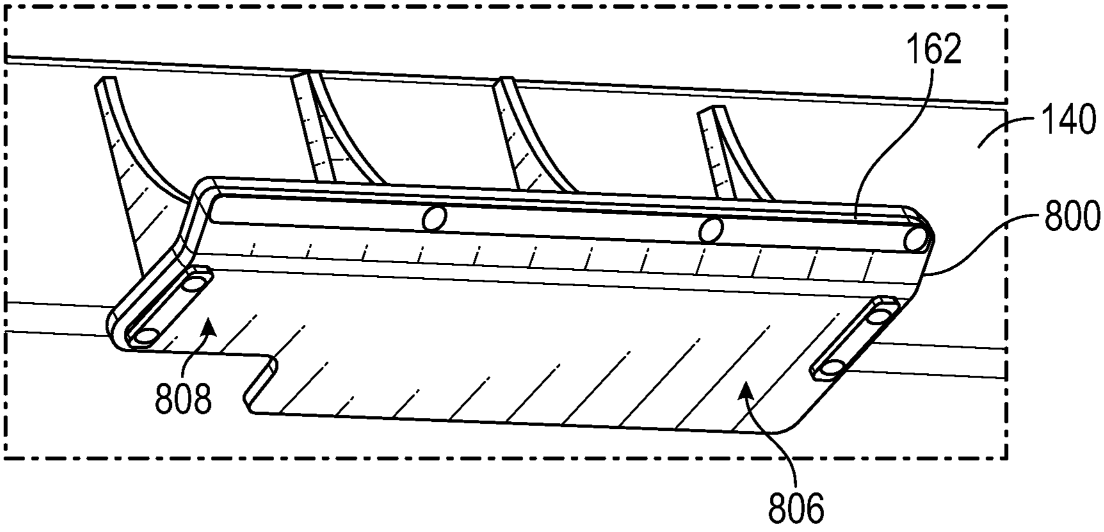
FIG. 8B is a bottom perspective view of the mating structure coupled to the trail frame.

FIGS. 8A and 8B depict perspective views of the mating structure 162 coupled to the trail frame 124 from a top perspective and from a bottom perspective, respectively. The mating structure 162 includes a top plate 800 and multiple fins 802 (4 fins 802*a, b, c*, and *d* in the illustrated example) for securing the top plate 800 to the trail frame 124.

A pad 806 (FIG. 8B) is optionally coupled to the mating surface 808 of the bottom plate 800. The pad 806 is positioned on the bottom/mating surface 808 of the top plate 800 such that it is adjacent the support surface 703 of the support structure 160 when the transport frame 202 is in the transport state and the trail frame 124 is rotated into the transport position. The pad 806 may be formed from an ultra high molecular weight (UHMW) plastic. The material for the pad 806 and the gap “d” are selected to reduce noise and wear caused by contact between the support structure 160 and the mating structure 162 during transport. The pad 806 may be coupled to the bottom plate using an adhesive or with a fastener(s) such as a bolt or rivet.

In an example, the components of the mating structure 162 are metal and are coupled together via welds at one or more intersections between the components (with an optional pad 806 on a bottom surface of the top plate 800). In accordance with this example, the mating structure 162 is fastened to the trail frame 124 by welds between the fins 802 and the horizontal main beam 140 of the trail frame 124 (such as welds 804*a* and 804*b* securing fin 802 to the main beam 140 and the top plate 800, respectively) and by welds between the top plate 800 and the horizontal mail beam 140 of the trail frame 124 (not shown).

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein but is intended to include all changes and modifications that are within the scope and spirit of the invention.

What is claimed is:

1. A mowing assembly having an integrated transport mechanism, the mowing assembly comprising:

a trail frame configured to support a mowing device and to be towed by an agricultural vehicle, the mowing device having a field position and a transport position;

a transport frame having a stowed state in which the transport frame is positioned above the mowing device and a transport state in which the mowing device is supported by the transport frame for transport, the transport frame comprising a vertical support and a non-vertical support extending from the vertical support;

a support structure coupled to the transport frame, the support structure having a bottom plate and an arcuate support structure extending from the bottom plate toward the non-vertical support, the bottom plate having a horizontal surface forming a support surface when the transport frame is in the transport state;

a mating structure coupled to the trail frame, the mating structure having a mating surface and positioned on the trail frame such that the mating surface is adjacent the support surface when the mowing device is in the transport position and the transport frame is in the transport state.

2. The mowing assembly of claim 1, wherein the mating surface is horizontal when the trail frame is in the transport position.

3. The mowing assembly of claim 2, wherein the support surface and the mating surface are rectangular.

4. The mowing assembly of claim 1, wherein the mating surface is less than 0.75 inch from the support surface when the mating surface is adjacent the support surface and the transport frame is in the transport state.

5. The mowing assembly of claim 1, further comprising:

a pair of lateral supports coupled to opposite sides of the vertical and non-vertical supports with the bottom plate and arcuate support structure therebetween.

6. The mowing assembly of claim 5, wherein the bottom plate comprises a metal plate and an ultra high molecular weight (UHMW) plastic pad positioned on the metal plate such that the UHMW plastic pad is adjacent the support surface when the transport frame is in the transport state.

7. The mowing assembly of claim 5, wherein the bottom plate further comprises a non-horizontal surface forming a lip configured to guide the mating structure when rotated into position.

8. The mowing assembly of claim 5, wherein the arcuate support comprises:

a first curved support having a first end coupled to the bottom plate and a second end;

a second curved support having a first end coupled to the second end of the first curved support and a second end coupled to the non-vertical support.

9. The mowing assembly of claim 8, wherein the first curved support is formed from a first elongate metal plate and the second curved support is formed from a second elongate metal plate and has three bends.

10. The mowing assembly of claim 1, wherein the trail frame has a horizontal main beam and wherein the mating structure comprises:

a top plate having a horizontal surface forming the mating surface when the trail frame is in the transport position;

a plurality of support fins between the top plate and the horizontal main beam.

11. The mowing assembly of claim 10, wherein at least one of the plurality of support fins is a separate plate welded on a first edge to the top plate and welded on a second edge to the horizontal main beam.

12. The mowing assembly of claim 10, wherein the top plate and at least one of the plurality of support fins is formed from a piece of metal with a bend defining an intersection between the top plate and the at least one of the plurality of support fins.

13. The mowing assembly of claim 10, wherein the top plate comprises a metal plate and an ultra high molecular weight (UHMW) plastic pad positioned on the metal plate such that the UHMW plastic pad is adjacent the support surface when the transport frame is in the transport state.

14. The mowing assembly of claim 1, further comprising:

a transport actuator configured to move the transport frame between the stowed state and the transport state.

15. A mowing system, comprising:

an agricultural vehicle; and the mowing assembly of claim 1 coupled to the agricultural vehicle.

16. A method for transporting a mowing assembly having an integrated lateral transport mechanism, the mowing assembly comprising a trail frame configured to support a mowing device and to be towed by an agricultural vehicle, the mowing device having a field position and a transport position, a transport frame having a stowed state in which the transport frame is positioned above the mowing device and a transport state in which the mowing assembly is supported by the transport frame for transport, the transport frame comprising a vertical support and a non-vertical support extending from the vertical support, a first support structure coupled to the transport frame, the first support structure including a bottom plate having a horizontal surface when the transport frame is in the transport state and an arcuate support structure extending from the bottom plate toward the non-vertical support, and a second support structure coupled to the trail frame, the second support structure having a mating surface that is adjacent the horizontal surface of the first support structure when the mowing device is in the field position and the transport frame is in the transport state, the method comprising:

moving the transport frame from the stowed state to the transport state in which the transport frame supports the mowing assembly;

rotating the trail frame with respect to the transport frame until the mating surface is adjacent the horizontal surface when the transport frame is in the transport state for transport by the integrated lateral transport mechanism.

17. The method of claim 16, wherein the mowing assembly further comprises a towing tongue rotatably coupled to the trail frame and a transport actuator coupled between the towing tongue and the transport frame, and wherein moving the transport frame from the stowed state to the transport state comprises:

activating the transport actuator to move the transport frame from the stowed state to the transport state.

18. The method of claim 17, wherein the mowing assembly further comprises a transport swing actuator coupled between the trail frame and the towing tongue, and wherein rotating the trail frame with respect to the transport frame until the mating surface is adjacent the horizontal surface when the transport frame is in the transport state comprises:

activating the transport swing actuator to rotate the trail frame with respect to the transport frame to position the mowing device in the transport position.

19. The method of claim 18, wherein the mowing assembly further comprises a field swing actuator coupled between the towing tongue and the trail frame and wherein moving the transport frame from the stowed state to the transport state is conditioned on:

rotating the trail frame to position the trail frame in a designated field position with respect to the towing tongue using the field swing actuator.

20. The method of claim 18, further comprising:

rotating the trail frame with respect to the transport frame until the mating surface is not adjacent the horizontal surface; and moving the transport frame from the transport state to the stowed state.

* * * * *